United States Patent
Torney et al.

(10) Patent No.: US 9,111,069 B1
(45) Date of Patent: Aug. 18, 2015

(54) LANGUAGE DETECTION TO IMPROVE EFFICIENCY OF CONTENT SCANNING ENGINE IN DATA LOSS PREVENTION (DLP) SYSTEMS

(71) Applicants: Milind Torney, Pune (IN); Sunil Mishra, San Francisco, CA (US)

(72) Inventors: Milind Torney, Pune (IN); Sunil Mishra, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 299 days.

(21) Appl. No.: 13/661,637

(22) Filed: Oct. 26, 2012

(51) Int. Cl.
G06F 17/28 (2006.01)
G06F 21/00 (2013.01)
H04L 29/06 (2006.01)

(52) U.S. Cl.
CPC ............... *G06F 21/00* (2013.01); *H04L 63/16* (2013.01)

(58) Field of Classification Search
CPC ....... G06F 21/55; H04L 63/102; H04L 67/02; G06Q 30/02
USPC ...................... 726/1, 2, 4, 22, 24, 26; 713/1, 2
See application file for complete search history.

(56) References Cited

U.S. PATENT DOCUMENTS

2011/0209195 A1* 8/2011 Kennedy ............................ 726/1
2013/0269029 A1* 10/2013 Nakawatase et al. ........... 726/22

OTHER PUBLICATIONS

No Author, "Microsoft Language Detection," printed from the Internet on Oct. 23, 2014, 1 page, World Wide Web Address http://msdn.microsoft.com/library/dd319066(VS.85).aspx.
No Author, "Google Translate API," printed from the Internet on Oct. 23, 2014, pp. 1-16, World Wide Web Address http://code.google.com/apis/language/translate/v2/using_rest.html.
No Author, "Proofpoint Introduces its Next-generation Email Security and Data Loss Prevention Platform, Available for On-demand, On-premises and Hybrid Deployments," printed from the Internet on Oct. 23, 2014, pp. 1-3, World Wide Web Address http://www.proofpoint.com/news-and-events/press-releases/proofpoint-introduces-its-next-generation-email-security-and-data-loss-prevention-platform-available-for-on-demand-on-premises-and-hybrid-deployments?PressReleaseID=216.
No Author, "Proofpoint Email Firewall," printed from the Internet on Oct. 23, 2014, pp. 1-2, World Wide Web Address http://www.proofpoint.com/datasheets/data-loss-prevention/DS-Proofpoint-Email-Firewall.pdf.

* cited by examiner

*Primary Examiner* — Brandon Hoffman
*Assistant Examiner* — Nega Woldemariam
(74) *Attorney, Agent, or Firm* — Lowenstein Sandler LLP (57) ABSTRACT

A method and apparatus for detection of DLP violations with language detection are described. A DLP product may monitor data content associated with the computing system, and identify a language of the data content. Based on the identified language, the DLP product identifies from among multiple DLP policies a first set of one or more DLP policies that are applicable for the identified language (referred to herein as language-specific DLP policies). The DLP product scans the data content using the first set to detect a violation of one of the DLP policies in the data content, and performs a DLP action in response to the detected violation.

17 Claims, 4 Drawing Sheets

LANGUAGE DETECTION TO IMPROVE EFFICIENCY OF CONTENT SCANNING ENGINE IN DATA LOSS PREVENTION (DLP) SYSTEMS

TECHNICAL FIELD

Embodiments of the invention relate to the field of processing data, and more particularly, to improving data loss prevention (DLP) by using language detection for the DLP content scanning engine.

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Organizations take lot of efforts to install DLP components, especially on important machines where confidential data is getting generated, but they may not be able to protect each computer in the enterprise, due to reasons like large number of different platforms or operating systems (OS), machine outages, quick and dynamic provisioning of virtual machines, no clear and individual accounting for test and lab machines. DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. More recently, communications between entities may be complex and difficult for a human to monitor.

Due to global business presence, many organizations have content classification polices supporting various languages. Current DLP solutions make use of all these policies irrespective of the language of content being scanned, which is quite inefficient. Ideally, content needs to be scanned only by using content specific policies. For example, there is no need to scan the data content with specific English-based polices when the data content is in Japanese.

SUMMARY OF THE INVENTION

A method and apparatus for detection of DLP violations with language detection are described. A DLP product may monitor data content associated with the computing system, and identify a language of the data content. Based on the identified language, the DLP product identifies from among multiple DLP policies a first set of one or more DLP policies that are applicable for the identified language (referred to herein as language-specific DLP policies). The DLP product scans the data content using the first set to detect a violation of one of the DLP policies in the data content, and performs a DLP action in response to the detected violation. The DLP product may use one or more language detection techniques, as described herein. In one embodiment, the data content is in an outbound data transfer, and the DLP product, such as a DLP agent, can identify one or more languages in the outbound data transfer to identify a set of applicable DLP policies to be used for scanning the data content for violations. The outbound data transfer may be to a destination, including a second computing system (e.g., a computer), a mobile phone, an application executing on the same or different computing system, a set of Internet Protocol (IP) addresses, a website, a Universal Serial Bus (USB) device, a disk device, an email address, an instant messenger service, a social network account, a remote application, or the like. In another embodiment, the data content is in an inbound data transfer and the DLP product, such as a DLP agent, can identify one or more languages in the inbound data transfer to identify a set of applicable DLP policies to be used for scanning the data content for violations. In another embodiment, the data content is stored in one or more data repositories that can be scanned by the DLP product. Alternatively, the data content may be scanned by a DLP scanning engine in various other context as would be appreciated by one of ordinary skill in the art having the benefit of this disclosure.

In one embodiment of a method, processing logic begins by monitoring outbound data transfers performed by the computing system. In one embodiment, the processing logic monitors outbound network traffic to other devices over a private or public network. Alternatively, the processing logic monitors other outbound data transfers, such as data transfers to other devices via other types of connections, including transfers to a USB drive, FTP file transfers, printing activities or the like. While monitoring data content, such as data content in the outbound data transfers, processing logic identifies a language of the data content (e.g., in a current one of the outbound data transfers). The language can be identified by the processing logic using any type of language detection technique. Similarly, the language detection techniques may identify a confidence level that can be used by the processing logic to determine which DLP policies should be used for content scanning. Based on the identified language, the processing logic identifies from multiple DLP policies a first set of policies that are applicable for the identified language. The processing logic scans the data content of the outbound data transfer using the first set to detect violations of those DLP policies. The processing logic determines if a violation of these DLP policies is detected. When the violation is detected, the processing logic performs a DLP action, such as preventing the current outbound data transfer or notifying an administrator of the violation. In other embodiments, instead of preventing the data transfer, the processing logic may perform other operations as specified by the policy, such as notifying a system administrator, prompting the user to deny or allow the data transfer, and the like.

In one embodiment, the processing logic determines if the data content includes protected information, as specified in the policy. For example, the data content may include confidential data, or other types of protected information.

In one embodiment of the method, the processing logic identifies from the DLP policies a second set of one or more DLP policies that has a different language than the identified language and identifies the first set as those DLP policies that are not in the second set. The processing logic scans the data content using the first set and not the second set to detect the violation of the selected DLP policies in the data content.

In another embodiment, the processing logic identifies the language of the data content before every scan. The processing logic can use any of the language detection techniques. The language detection routine may indicate the language of the content with a confidence level. For example, the language detection routine can tell the data content is 90% English, 5% French, 2% German. In this case, DLP product selects the set of DLP policies to use for scanning based on the language detection results.

In one embodiment of identifying the language of the data content, the processing logic identifies a first language of the data content in the data content, and identifies a second language of the data content in the data content. The processing logic identifies a first subset of one or more DLP polices that are applicable for the first language and a second subset of one or more DLP policies that are applicable for the second language. The first and second subsets make up the first set for content scanning.

In one embodiment, the processing logic performs a DLP action in response to a detected violation. In one embodiment, the processing logic prevents the current outbound data transfer to be sent to a destination in response to the detected violation. In another embodiment of the method, the processing logic permanently or temporarily blocks the current outbound data transfer to the destination entity (e.g., second computing system) in response to detection of the violation. In a further embodiment, the processing logic creates a record of the detected violation. In another embodiment of the method, the processing logic notifies a user or an administrator when the data content violates one of the language-specific DLP policies. Alternatively, the processing logic can perform other DLP remedial or preventative actions as would be appreciated by one of ordinary skill in the art having the benefit of this disclosure.

In addition, a computer readable storage medium for determining whether a second computing system meets a minimum level of protection for a DLP policy of a first computing system is described. An exemplary computer readable storage medium provides instructions, which when executed on a processing system causes the processing system to perform a method such as the exemplary methods discussed above.

Further, systems and apparatus for determining whether a second computing system meets a minimum level of protection for a DLP policy of a first computing system are described. An exemplary apparatus may include a memory and a processor coupled to the memory. The processor is configured to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for detection of DLP violations with language detection are described. A DLP product may monitor data content associated with the computing system, and identify a language of the data content. Based on the identified language, the DLP product identifies from among multiple DLP policies a first set of one or more DLP policies that are applicable for the identified language (referred to herein as language-specific DLP policies). The DLP product scans the data content using the first set to detect a violation of one of the DLP policies in the data content, and performs a DLP action in response to the detected violation. The DLP product may use one or more language detection techniques, as described herein. The data content may be in an outbound data transfer monitored by a DLP agent. The outbound data transfer may be to a destination, including a second computing system (e.g., a computer), a mobile phone, an application executing on the same or different computing system, a set of Internet Protocol (IP) addresses, a website, a Universal Serial Bus (USB) device, a disk device, an email address, an instant messenger service, a social network account, a remote application, or the like.

In one embodiment, the DLP product includes a DLP scanning with language detection engine to identify the language of the data content to be scanned and scanning the data content with DLP policies that are specific to that identified language. In this manner, the DLP product can operate in a more efficient manner. To continue with the example above, there is no need to scan the data content with specific English-based polices when the data content is in Japanese. The DLP product, when identifying the data content as being in Japanese, does not scan the data content for violations of the specific English-based policies. This provides an improved DLP system. In some embodiments, the outbound data transfers from the computing system are passed through the detection system, which identifies the languages used in the outbound data transfers and determines whether the data transfer violates DLP policies that are applicable to the identified languages based on various factors. Unlike conventional systems that scan the data content for violations of the DLP policies, the DLP agent can scan using DLP policies that are specific to that language of the data content. If the data transfer violates the DLP policy, the DLP scanning with language detection engine can permanently or temporarily block the data transfer and initiates a DLP action, such as notifying the user or an administrator of the network, creating a record of the violation incident or other DLP actions as would be appreciated by one of ordinary skill in the art having the benefit of this disclosure.

In the following description, numerous details are set forth. It will be apparent, however, to one of ordinary skill in the art having the benefit of this disclosure, that embodiments of the present invention may be practiced without these specific details.

Figure 1:
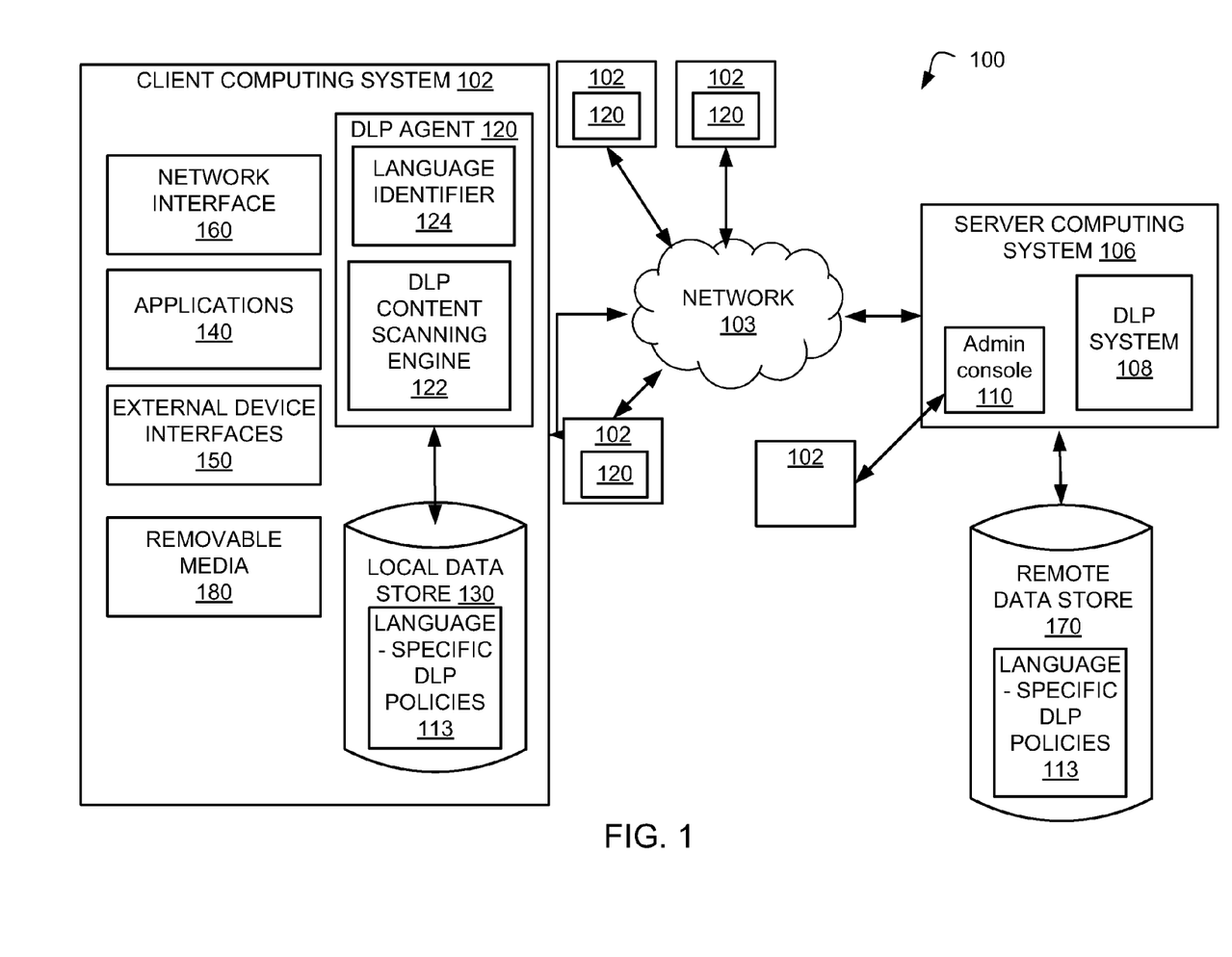
FIG. 1 is a block diagram of exemplary network architecture in which embodiments of a DLP scanning engine with language detection may operate.

FIG. 1 is a block diagram of an exemplary network architecture 100 in which embodiments of a DLP content scanning engine 122 with language detection may operate. The network architecture 100 may include multiple client computing systems 102 and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. In another embodiment, the computing systems may reside on different networks. The server computing systems 106 may host a DLP system 108. In one embodiment, the client computing systems 102 and server computing systems 106 may be part of an organization, such as a corporate enterprise. Alternatively, the server computing system 106 and the computing systems 102 may be part of different organizations. In other embodiments, the server computing system 106 may be one or more machines.

The DLP system 108 may communicate with DLP agents 120. Although the embodiments may be used in a DLP system using DLP agents 120, the embodiments may also be used in other DLP products, such as a DLP system deployed on a gateway or on a server computing system. Also, the embodiments described herein may be used in other applications that can be used for detecting violations of policies as would be appreciated by one of ordinary skill in the art having the benefit of this disclosure.

The DLP agents 120 include a DLP content scanning engine 122 with language detection, which is configured to identify one or more languages used in the data content of outbound data transfers, and scan the data content based on the identification of which DLP policies are applicable to the identified language. The outbound data transfers can be to various types of destinations, including other computing systems in the network 100 or other destinations, such as remote devices, USB drives, network drives, printers or the like. The DLP agent 120 monitors outbound data transfers by the client computing system 102 (e.g., transmitting entity) to destination entities to detect violations of the DLP policy using the language-specific DLP policies 113. When a violation is detected in one of the data transfers, the DLP content scanning engine 122 with language detection can initiate a DLP action to protect the data being protected by the DLP policies. In one embodiment, the destination entity is the second computing system 102, which includes a DLP agent 120, developed by the same vendor as the DLP agent 120 of the client computing system 102. In another embodiment, the destination entity is a third computing system 102, which includes a DLP agent 120, developed by a different vendor as the DLP agent 120.

The DLP system 108 may communicate with DLP agents 120 on the client computing systems 102 to perform operations to enforce a DLP policy as described herein. In one embodiment, the DLP agent 120 includes a language identifier 124 and a DLP content scanning engine 122. In another embodiment, the language identifier 124 and DLP scanning engine are integrated component of the DLP agent 120 as would be appreciated by one of ordinary skill in the art having the benefit of this disclosure. The language identifier 124 is configured to identify one or more languages being used in the data content. After identifying the languages used in the outbound data transfer by the language identifier 124, the DLP content scanning engine 122 selects which DLP policies should be used and should not be used based on the language-specific DLP policies 113. In another embodiment, the language identifier 124 is configured to select which language-specific DLP policies 113 should be used for content scanning by the DLP content scanning engine 122. The DLP content scanning engine 122 is configured to detect a violation of a DLP policy in the outbound data transfers using the language-specific DLP policies 113. If the DLP content scanning engine 122 detects a violation of one of the selected DLP policies, the DLP content scanning engine 122 or another component of the DLP agent 120 can protect the data using a DLP action. These DLP actions can be preventive actions, such as preventing the data transfer. Alternatively, the DLP actions can be remedial, such as creating a record that can be addressed by an administrator or that triggers some other manual or automated processes. In one embodiment, when the data transfer violates the DLP policy, the DLP agent 120 creates an incident record of the violation, and may send the incident record to the DLP system 108, for example. The DLP system 108 is configured to receive the incident record of the violation from the DLP agent 120. In these embodiments, the DLP agent 120 creates the incident records. However, in other embodiments, any DLP product may be used to detect a violation and create an incident, and it is not limited to using DLP agents on an endpoint, as described herein. It should also be noted that other systems than DLP systems can use the DLP content scanning engine 122 to identify the language of the data content being scanning and select which of the language-specific DLP policies 113 is to be used for content scanning.

Although only one server computing systems 106 are illustrated in FIG. 1, the DLP system 108 may be hosed on one or more machines, including one or more server computers, client computers, gateways or other computing devices. In yet another configuration, the DLP service may reside on a single server, or on different servers, coupled to other devices via a public network (e.g., the Internet) or a private network (e.g., LAN). In one embodiment, the DLP system 108 is part of an organization's system referred to herein as entity. In another embodiment, a service provider hosts the DLP system 108. The hosted service provider may also have multiple instances of the DLP system 108 on multiple networks that communicate with the service provider over a public or private network. It should be noted that various other network configurations can be used including, for example, hosted configurations, distributed configurations, centralized configurations, etc.

The depicted client computing system 102, which may operate as an endpoint machine in an enterprise network that uses the DLP system 108 to enforce one or more DLP policies, includes a DLP agent 120 that communicates with the DLP system 108. Embodiments of the DLP agent 120, which includes the DLP content scanning engine 122 and language identifier 124, are described below with respect to FIGS. 2-3. The client computing system 102 may include applications 140, external device interfaces 150, network interfaces 160 and removable media 180 that can be monitored by the DLP agent 120 as would be appreciated by one of ordinary skill in the art having the benefit of this disclosure. Alternatively, the DLP agent 120 can monitor other aspects of the client computing system 102 to monitor outbound data transfers. The client computing system 102 may also include a local data store 130, which can be one or more centralized data repositories that store the violation information, DLP policy information, and the like. In one embodiment, the language-specific DLP policies 113 can be stored in the local data store 130. Alternatively, the language-specific DLP policies 113 can be stored remotely form the client computing system 102, such as in the remote data store 170. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network.

Figure 2:
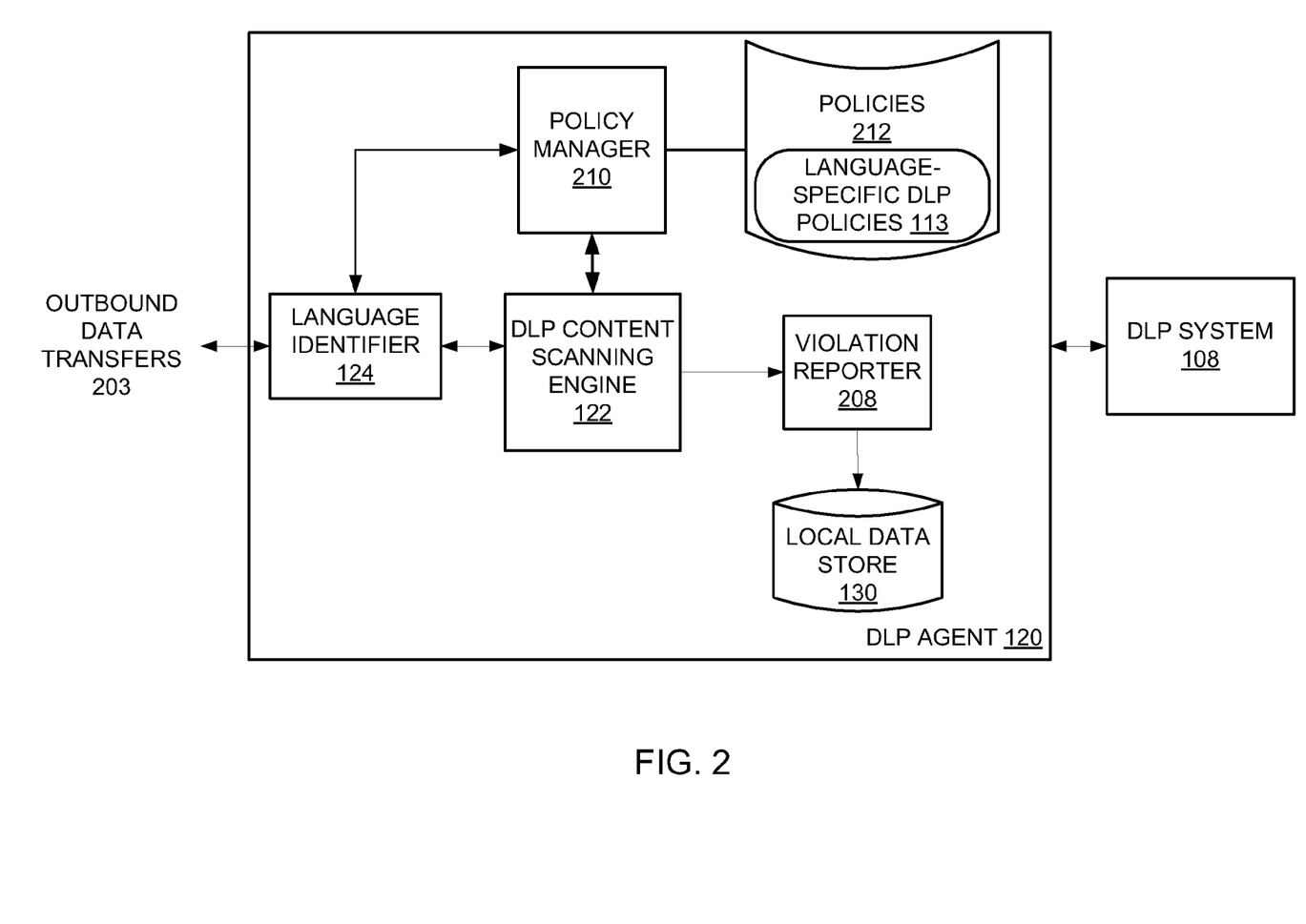
FIG. 2 is a block diagram of one embodiment of a DLP agent, including a DLP scanning engine with language detection and a detection system to detect violations of a DLP policy.

FIG. 2 is a block diagram of one embodiment of a DLP agent 120, including the DLP content scanning engine 122 and language identifier 124 to detect violations of one or more language-specific DLP policies 113. The DLP agent 120 also includes a violation reporter 208, a policy manager 210 and a policy data store that stores DLP policies 212. In the depicted embodiment, the DLP content scanning engine 122 is configured to monitor outbound data transfers 203. The outbound data transfers 203 may include data in transit, such as data associated with outgoing messages or other network traffic being sent by the client computing system 102 to a destination entity. The outbound data transfers 203 may also include data being printed, copied to a remote storage device such as USB drive, transferred to a remote disk, or the like. The outbound data transfers 203 may be any data being transferred by the client computing system 102 via a wireless or wired connection to a destination entity, such as another device or to a remote device, such as, for example, a removable storage drive. The outbound data transfers 203 may be over the network 103 or over direct connections to the client computing system 102.

The language identifier 124 is configured to detect one or more languages in the data content of the outbound data transfers 203. The language identifier 124 can also specify a confidence level of the identified languages. For example, the language identifier 124 can indicate that it has a 90% confidence that the data content of the outbound data transfers 203 contains English. Similarly, the language identifier 124 indicates that the outbound data transfer 203 includes English and German, and may specify the confidence for each of these identified languages. The language identifier 124 can notify the DLP content scanning engine 122 of the identified languages so that the appropriate language-specific DLP policies 113 can be used for content scanning. In another embodiment, the language identifier 124 notifies the policy manager 210 the identified languages, and the policy manager 210 determines which of the policies 212 are the language-specific policies 113 that should be used for content scanning by the DLP content scanning engine 122. The language identifier 124 can be integrated into the DLP agent 120. In other embodiments, the DLP agent 120 can call a language identifier function in a separate application. For example, there are available language detection technologies that can be used in connection with the DLP agent 120, such as Microsoft's language detection, Google's language detection or the like. These language detection technologies typically provide an API that can be used by the DLP agent 120 to identify languages. These identified languages can be used by the policy manager 210, the DLP content scanning engine 122, or both to select the appropriate set of language-specific DLP policies 113 for content scanning by the DLP content scanning engine 122. In one embodiment, the input provided to the Microsoft Language Detection service is the data content of the outbound data transfer 203. This input may need to be formatted or reformatted to a specific format, such as UTF-16 text, to be processed by the Microsoft Language Detection service. The Microsoft Language Detection service checks the Unicode script of the text provided by the application (DLP agent 120). It segments the text based on the scripts that it detects, and then determines the language in which each segment is written. If a script indicates a single language, the language is guaranteed to be present in the output list of languages. The service uses a specified algorithm to determine the relevance of each supported language. In another embodiment, Google Translate API v2, which uses RESTful calling style, can be used to detect language. For example, the DLP agent 120 can send a text string to the service by sensing an HTTP GET request to its URI (e.g., https://www.goggleapis.com/language/translate/v2/detect?parameters. One of the parameter of the request can identify the string whose language for identification (e.g., q parameter). Also, a POST can be used to invoke the API to send more data in a single request. The q parameter in the POST body should be less than 5K characters. Here is an example GET request for "What language is this." GET https://www.googleapis.com/language/translate/v2/detect?key=INSERT-YOUR-KEY&q, What %20language %20is %20this. If the request succeeds, the server responds with an HTTP status code and the data properties: identified language, reliability and confidence. Here is another example that passes multiple source text strings to language-detect: GET https://www.googleapis.com/language/translate/v2/detect?key=INSERT-YOUR-KEY&q=Hello %20world. The result may include multiple languages and reliability and confidence of each. The source text can use the q parameter that identifies the text to be detected, and this parameter can be repeated more than once in a single request to detect multiple texts. Although the specifics of Microsoft Language Detection and Google Translate APIs have been described, other language detection techniques could be used.

The DLP content scanning engine 122 is configured to determine whether the data transfer 203 violates one of more of the language-specific DLP policies 113 based on the identified language by the language identifier 124. The DLP content scanning engine 122 is used to detect violations in the selected DLP policies and may perform some remedial or notification operation to help enforce the DLP policies. In the embodiments described herein, when the DLP content scanning engine 122 detects a violation, it permanently or temporarily blocks the data transfer 203 and notifies the violation reporter 208 of the violation. When the DLP content scanning engine 122 determines that the outbound data transfer 203 does not violate one of the selected DLP policies, the DLP content scanning engine 122 can allow the data transfer 203. For example, the DLP content scanning engine 122 can remove a temporary block on the data transfer 203. However, if the DLP content scanning engine 122 detects a violation, the DLP content scanning engine 122 may prevent the data transfer, may allow the transfer but generate an incident report and/or notify an administrator. Alternatively, other DLP actions can be performed by the DLP content scanning engine 122 or the violation reporter 208. In another embodiment, the DLP content scanning engine 122 can ask the user if they would like to proceed with the data transfer 203, alerting them to the fact that the outbound data transfer contains protected data. Alternatively, the DLP content scanning engine 122 can perform other remedial or preventative actions as would be appreciated by one of ordinary skill in the art having the benefit of this disclosure.

In some embodiments, when the DLP content scanning engine 122 can alert a user or an administrator of the network that a violation has been detected to initiate manual or automated processes to address the violation. The alert may contain information about the violation, the outbound data transfer 203 and the destination entity.

In one embodiment, when the DLP content scanning engine 122 determines that the outbound data transfer 203 would violate the policy, the violation reporter 208 creates an incident record of the violation, and sends the incident record to the DLP system 108 and/or stores the incident record in the local data store 130. The violation reporter 208 can send the incident records as they are generated or periodically. Similarly, the violation reporter 208 can send multiple incident records to the DLP system 108 in batches or sequentially. If a violation is detection, the violation reporter 208 may notify a system administrator (e.g., send an email or update a log file) about the policy violation incident, and may send information about the policy violation incident to the DLP service provider (e.g., DLP system 108). The information sent to the DLP service provider may identify, for example, the DLP policy being violated, the type of data being transferred, the destination entity specified to receive the data transfer, or other information concerning the violation, an identifier of the user or the client computing system 102 that caused the violation, as well as other information that may be helpful in remedying or recording the incidents.

The policy manager 302 defines DLP policies and stores them in the policy data store that stores DLP policies 212. In particular, the policy manager 302 can be used to manage the policies 212 to identify language-specific DLP policies 113. The language-specific DLP policies 113 can be designated using a field in the specific policy to identify the language of the language-specific policy 113. In one embodiment, the DLP agent 120 receives the policies 212 from the DLP system 108 and the DLP system 108 is used to classify the policies 212 to include the language of the specific policy. This allows language-specific DLP policies 113 to be selectively used by the DLP content scanning engine 122 for content scanning. The policy may require monitoring for data transfers. The policy manager 302 may create DLP policies based on user input, such as from the user of the client computing system 102 or an administrator of an organization providing the client computing system 102. Alternatively, the policy manager 302 may receive DLP policies 212 from a DLP service provider (e.g., DLP system 108) and store them in the policy data store.

The DLP system 108 is configured to receive the incident record of the violation from the violation reporter 208, and may be configured to perform some remedial or reporting operation as would be appreciated by one of ordinary skill in the art having the benefit of this disclosure. Referring back to FIG. 1, the server computing system 106 can provide an administrator console 110 for the DLP system 108. The administrator of the network can use the administrator console 110 to manually identify the language of the DLP policies, and these language-specific DLP policies 113 can be stored in the remote data store 170 and can be pushed to the DLP agents 120 to be used by the DLP content scanning engines 122. Alternatively, the DLP policies themselves can be scanned, such as using the language detection techniques to identify the language of the DLP policies. The DLP policies may include a field that identifies one or more languages used by the DLP policy, making the DLP policy a language-specific DLP policy 113 that can be used for selective scanning by the DLP content scanning engine 122.

It should be noted that the DLP system 120 may include other components for monitoring outbound data transfers 203 for the data transfers to detect violations of the DLP policy, as well as other types of policies. Details regarding these other components have not been included to not obscure the description of the present embodiments.

Figure 3:
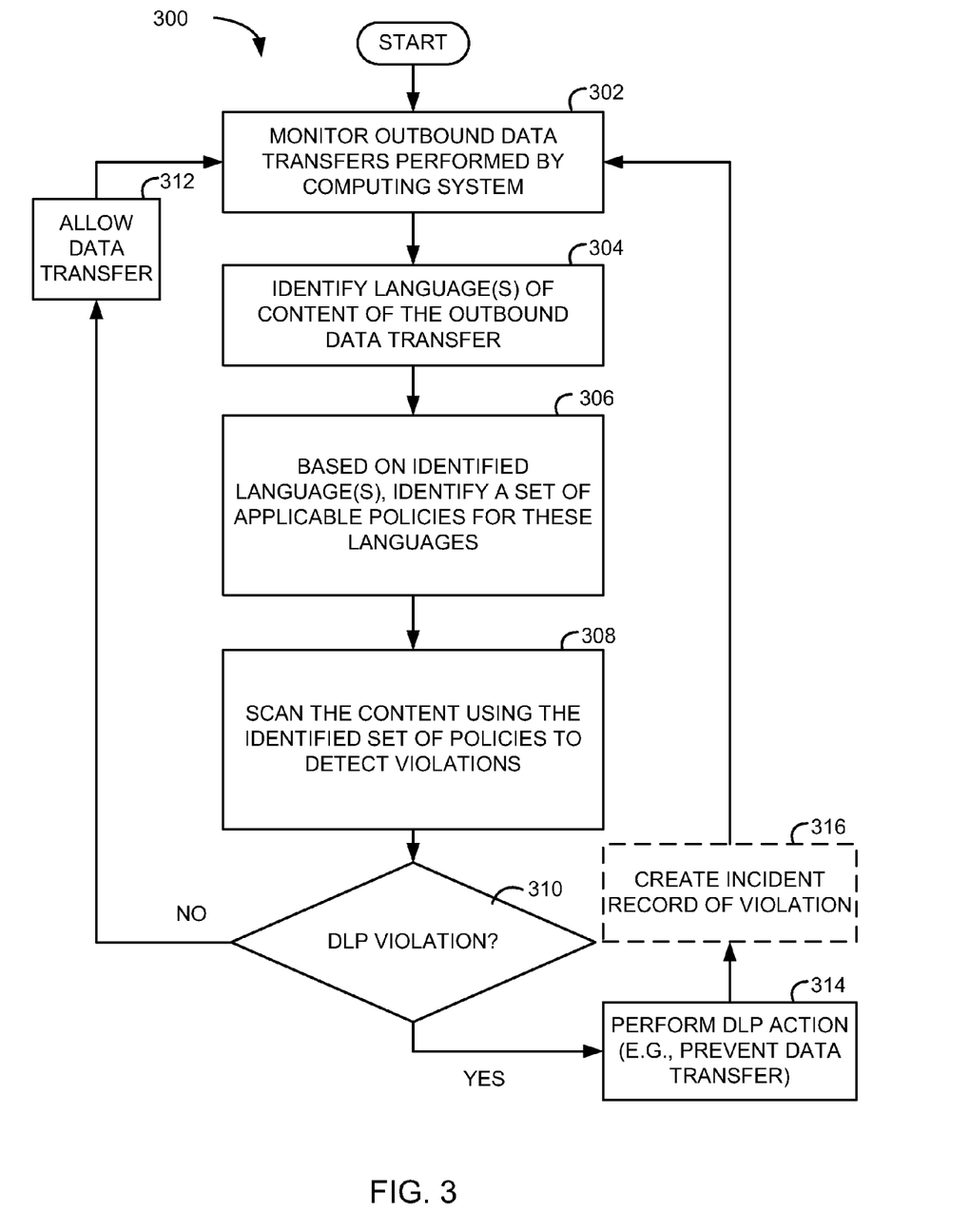
FIG. 3 is a flow diagram of one embodiment of a method of DLP scanning with language detection to detect a violation of a DLP policy.

FIG. 3 is a flow diagram of one embodiment of a method 300 of DLP scanning with language detection to detect a violation of a DLP policy. The method 300 is performed by processing logic that may comprise hardware (circuitry, dedicated logic, etc.), software (such as is run on a general-purpose computing system or a dedicated machine), or a combination of both. In one embodiment, the client computing system 102 of FIG. 1 performs the method 300. In another embodiment, the DLP agent 120 of FIGS. 1 and 2 performs the method 300. In another embodiment, the DLP content scanning engine 122 and language identifier 124 of FIGS. 1 and 2 perform the method 300. Alternatively, other components of the client computing system 102 or server computing system 106 can be configured to perform some or all of the method 300.

Referring to FIG. 3, processing logic begins method 300 by monitoring outbound data transfers performed by the computing system (block 302). In one embodiment, the processing logic monitors outbound network traffic to other devices over a private or public network. Alternatively, the processing logic monitors other outbound data transfers, such as data transfers to other devices via other types of connections, including transfers to a USB drive, FTP file transfers, printing activities or the like. While monitoring in block 302, processing logic identifies one or more languages of content in a current one of the outbound data transfers (block 304). The one or more languages can be identified by the processing logic using any type of language detection technique. Similarly, the language detection techniques may identify a confidence level that can be used by the processing logic to determine which DLP policies should be used for content scanning. Based on the identified language, the processing logic identifies from multiple DLP policies a first set of applicable DLP policies for the identified languages (block 306). The processing logic scans the data content of the outbound data transfer using the set of applicable DLP policies to detect violations of those DLP policies (block 308). The processing logic determines if a violation of these DLP policies is detected (block 310). If the processing logic does not detect a policy violation at block 310, the processing logic allows the data transfer (block 312), and returns to monitoring at block 302. If the processing logic detects a DLP violation at block 310, the processing logic performs a DLP action (block 314), such as preventing the current data transfer to the destination entity. The processing logic may create an incident record of the violation (block 316). In other embodiments, instead of preventing the data transfer, the processing logic may perform other operations as specified by the policy, such as notifying a system administrator, prompting the user to deny or allow the data transfer, and the like.

In one embodiment, the processing logic at block 304 determines if the current outbound data transfer includes protected information, as specified in the policy. For example, the outbound data transfer may include confidential data, or other types of protected information.

In one embodiment of the method, the processing logic identifies from the DLP policies a second set of one or more DLP policies that have the same language as the identified language. The processing logic scans the data content using the second set and not the first set to detect the violation of the selected DLP policies in the current outbound data transfer.

In one embodiment of identifying the language of the data content, the processing logic identifies a first language of the data content in the current outbound data transfer, and identifies a second language of the data content in the current outbound data transfer. The processing logic identifies a first subset of one or more DLP polices that have a different language than the first language and a second subset of one or more DLP policies that have a different language than the second language. The first and second subsets are excluded from content scanning.

In one embodiment, the processing logic performs a DLP action in response to a detected violation. In one embodiment, the processing logic prevents the current outbound data transfer to be sent to a destination in response to the detected violation. In another embodiment of the method, the processing logic permanently or temporarily blocks the current outbound data transfer to the destination entity (e.g., second computing system) in response to detection of the violation. In a further embodiment, the processing logic creates a record of the detected violation. In another embodiment of the method, the processing logic notifies a user or an administrator when the outbound data transfer violates one of the language-specific DLP policies. Alternatively, the processing logic can perform other DLP remedial or preventative actions as would be appreciated by one of ordinary skill in the art having the benefit of this disclosure.

The embodiments described above are directed to scanning for violations of the DLP policies in outbound data transfers. In other embodiments, the processing logic can scan the data content in various conditions apart from the out bound data transfer. For example, the processing logic can scan various repositories like SharePoint, databases and file folders etc. Also, classification servers can scan the data content for the purpose of classification, as well as identifying languages of the data content so that an applicable set of policies pertaining to the identified languages can be used. In other embodiments, the processing logic can scan in bound data transfers. In other embodiments, the processing logic can be implemented in a DLP scanning engine of various DLP products as would be appreciated by one of ordinary skill in the art having the benefit of this disclosure.

Figure 4:
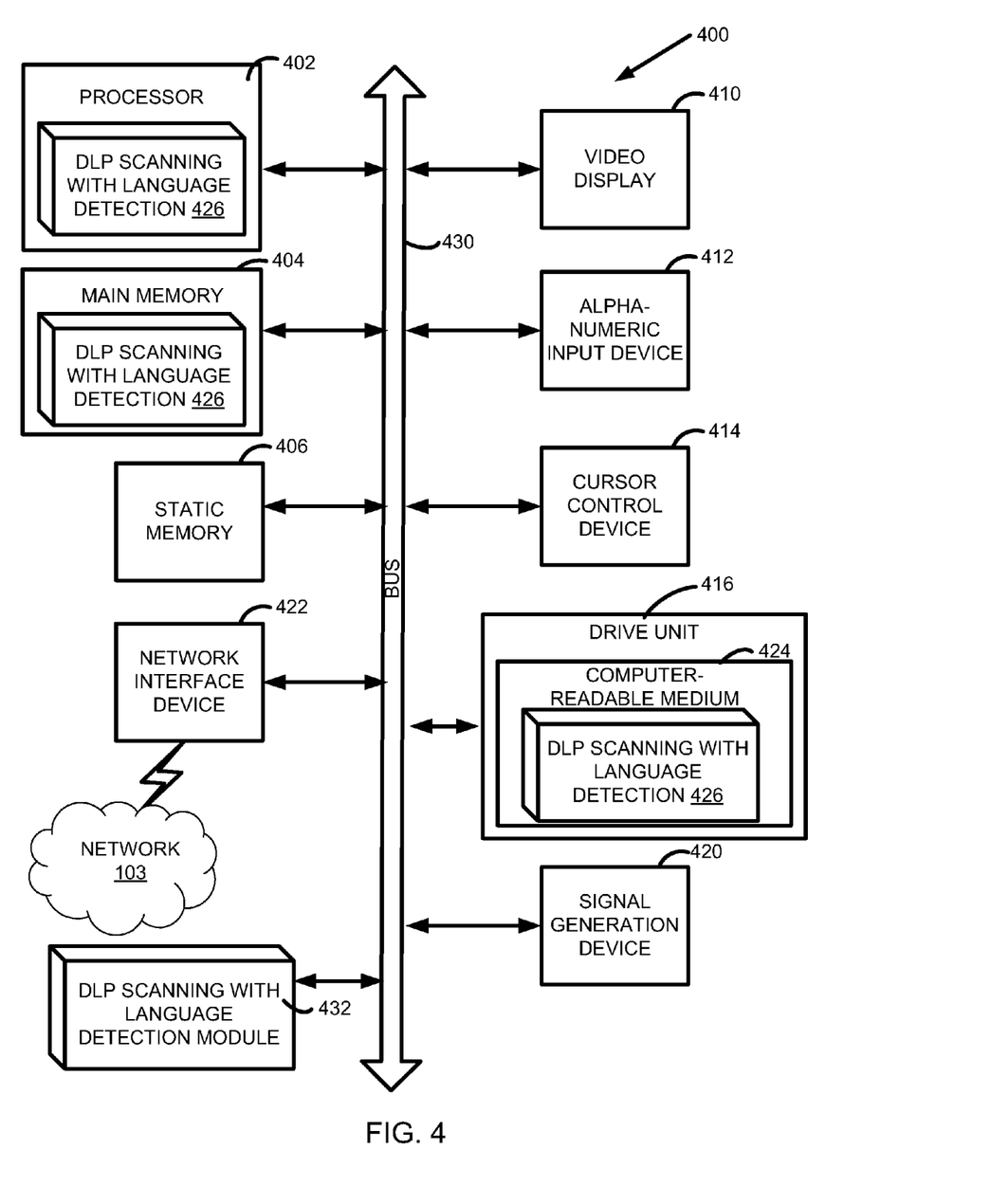
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as method 300 of FIG. 3.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for DLP scanning with language detection 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., DLP scanning with language detection 426) embodying any one or more of the methodologies or functions described herein. The DLP scanning with language detection 426 may also reside, completely or at least partially, within the main memory 404 and/or within the processor 402 during execution thereof by the computing system 400, the main memory 404 and the processor 402 also constituting computer-readable media. The DLP scanning with language detection 426 may further be transmitted or received over a network 420 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The DLP scanning with language detection module 432, components, and other features described herein (for example in relation to FIGS. 1, 2, 3) can be implemented as discrete hardware components or integrated in the functionality of hardware components such as ASICS, FPGAs, DSPs, or similar devices. The DLP scanning with language detection module 432 may implement operations of DLP scanning with language detection as described herein with respect to FIG. 3. In addition, the DLP scanning with language detection module 432 can be implemented as firmware or functional circuitry within hardware devices. Further, the DLP scanning with language detection module 432 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "identifying," "storing," "providing," "selecting," "obtaining," "receiving," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:
   monitoring, by a data loss prevention (DLP) product, data content associated with the computing system;
   identifying, by the DLP product, a natural language of the data content;
   based on the identified natural language, identifying from a plurality of DLP policies a first set of one or more DLP policies that are applicable for the identified natural language;
   identifying a second set of one or more DLP policies with a different natural language than the identified natural language, wherein the first set one or more DLP policies are not in the second set one or more DLP policies;
   scanning the data content using the first set and not the second set to detect a violation of one of the plurality of DLP policies in the data content; and performing a DLP action in response to the detected violation.

2. The method of claim 1, wherein the identifying the natural language of the data content comprises identifying the natural language of the data content using a natural language detection technique.

3. The method of claim 1, wherein the identifying the natural language of the data content comprises:
   identifying a first natural language of the data content;
   identifying a second natural language of the data content, wherein the identifying the first set comprises:
      identifying a first subset of one or more DLP polices that are applicable to the first natural language; and
      identifying a second subset of one or more DLP policies that are applicable to the second natural language.

4. The method of claim 1, wherein the scanning the data content comprises detecting that the data content comprises protected information.

5. The method of claim 1, wherein the data content is in an outbound data transfer, and wherein the performing the DLP action comprises preventing the outbound data transfer to be sent to a destination in response to the detected violation.

6. The method of claim 1, wherein the performing the DLP action comprises creating a record of the detected violation.

7. The method of claim 1, wherein the performing the DLP action comprises notifying at least one of a user of the computing system or an administrator of a network in which the computing system is deployed about the detected violation.

8. A computing system, comprising:
   a memory; and
   a processor coupled with the memory to:
      monitor, by a data loss prevention (DLP) product, data content associated with the computing system;
      identify, by the DLP product, a natural language of the data content;
      based on the identified natural language, identify from a plurality of DLP policies a first set of one or more DLP policies that are applicable for the identified natural language;
      identify a second set of one or more DLP policies with a different natural language than the identified natural language, wherein the first set one or more DLP policies are not in the second set one or more DLP policies;
      scan the data content using the first set and not the second set to detect a violation of one of the plurality of DLP policies in the data content; and
      perform a DLP action in response to the detected violation.

9. The computing system of claim 8, wherein the processor is further to identifying the natural language of the data content using a natural language detection technique.

10. The computing system of claim 8, wherein the processor is further to:
    identify a first natural language of the data content in the data content;
    identify a second natural language of the data content in the data content;
    identify a first subset of one or more DLP polices that are applicable to the first natural language; and
    identify a second subset of one or more DLP policies are applicable to the second natural language.

11. The computing system of claim 8, wherein the data content is in an outbound data transfer, and wherein the processor is further to prevent the current outbound data transfer to be sent to a destination in response to the detected violation.

12. The computing system of claim 8, wherein the processor is further to create a record of the detected violation.

13. The computing system of claim 8, wherein the processor is further to notify at least one of a user of the computing system or an administrator of a network in which the computing system is deployed about the detected violation.

14. A non-transitory computer readable storage medium including instructions that, when executed by a processor, cause the processor to perform a method comprising:
    monitoring, by a data loss prevention (DLP) product, data content associated with the computing system;
    identifying, by the DLP product, a natural language of the data content;
    based on the identified natural language, identifying from a plurality of DLP policies a first set of one or more DLP policies that are applicable for the identified natural language;
    identifying a second set of one or more DLP policies with a different natural language than the identified natural language, wherein the first set one or more DLP policies are not in the second set one or more DLP policies;
    scanning the data content using the first set and not the second set to detect a violation of one of the plurality of DLP policies in the data content; and
    performing a DLP action in response to the detected violation.

15. The non-transitory computer readable storage medium of claim 14, wherein the identifying the natural language of the data content comprises:
    identifying a first natural language of the data content;
    identifying a second natural language of the data content, wherein the identifying the first set comprises:
       identifying a first subset of one or more DLP polices that are applicable to the first natural language; and
       identifying a second subset of one or more DLP policies that are applicable to the second natural language.

16. The non-transitory computer readable storage medium of claim 14, wherein the data content is in an outbound data transfer, and wherein the performing the DLP action comprises preventing the current outbound data transfer to be sent to a destination in response to the detected violation.

17. The non-transitory computer readable storage medium of claim 14, wherein the performing the DLP action comprises:
    creating a record of the detected violation; and
    notifying at least one of a user of the computing system or an administrator of a network in which the computing system is deployed about the detected violation.

* * * * *